US011313261B1

(12) United States Patent
Gumaste et al.

(10) Patent No.: US 11,313,261 B1
(45) Date of Patent: Apr. 26, 2022

(54) SYSTEMS AND METHODS FOR HOLE DETECTION IN CRANKCASE VENTILATION TUBING

(71) Applicant: Cummins Inc., Columbus, IN (US)

(72) Inventors: Rohan Achyut Gumaste, Louisville, KY (US); Mark W. Pyclik, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/065,959

(22) Filed: Oct. 8, 2020

(51) Int. Cl.
| | | |
|---|---|---|
| *F02D 41/22* | (2006.01) | |
| *F01M 1/20* | (2006.01) | |
| *F02D 41/24* | (2006.01) | |
| *F01M 13/00* | (2006.01) | |

(52) U.S. Cl.
CPC ............ *F01M 1/20* (2013.01); *F02D 41/22* (2013.01); *F02D 41/2477* (2013.01); *F01M 2013/0083* (2013.01); *F02D 2200/024* (2013.01)

(58) Field of Classification Search
CPC .. F01M 1/20; F01M 2013/0083; F02D 41/22; F02D 41/2477; F02D 2200/024
USPC ................................................. 123/572–574
See application file for complete search history.

(56) References Cited

U.S. PATENT DOCUMENTS

| | | | | |
|---|---|---|---|---|
| 7,080,547 B2* | 7/2006 | Beyer | ................... | F01M 11/10 73/114.01 |
| 8,887,559 B2 | 11/2014 | Kuhn et al. | | |
| 9,068,486 B2 | 6/2015 | Rollinger et al. | | |
| 9,127,578 B2 | 9/2015 | Pursifull et al. | | |
| 9,260,990 B2 | 2/2016 | Rollinger et al. | | |
| 9,316,131 B2 | 4/2016 | Rollinger et al. | | |
| 9,382,823 B2 | 7/2016 | Rollinger et al. | | |
| 9,416,694 B2 | 8/2016 | Jentz et al. | | |
| 9,664,079 B2 | 5/2017 | Jentz et al. | | |
| 9,714,590 B2 | 7/2017 | Rollinger et al. | | |
| 9,790,885 B2 | 10/2017 | Rollinger et al. | | |
| 10,043,352 B2 | 8/2018 | Henson et al. | | |
| 10,907,591 B2* | 2/2021 | Golladay | ............. | F01M 13/022 |
| 2018/0030937 A1 | 2/2018 | Golladay et al. | | |

FOREIGN PATENT DOCUMENTS

EP     0 860 589     8/1998

* cited by examiner

*Primary Examiner* — Hai H Huynh
(74) *Attorney, Agent, or Firm* — Foley & Lardner LLP

(57) ABSTRACT

Systems, devices and methods for diagnosing malfunctioning in a crankcase ventilation (CCV) system can include a controller receiving a plurality of pressure values. The plurality of pressure values include a first pressure value indicative of pressure of gases flowing between a crankcase and a breather assembly, a second pressure value indicative of pressure of gases flowing through a CCV tube from the breather assembly, and a third pressure value representing pressure of gases in a tube connected to the CCV tube. The controller can calculate a pair of pressure differences including a first pressure difference between the first pressure value and the second pressure value and a second pressure difference between the first pressure value and the third pressure value. The controller can detect a malfunctioning or defect in the CCV system based on the pair of pressure differences falling within a predefined clustering region.

20 Claims, 11 Drawing Sheets

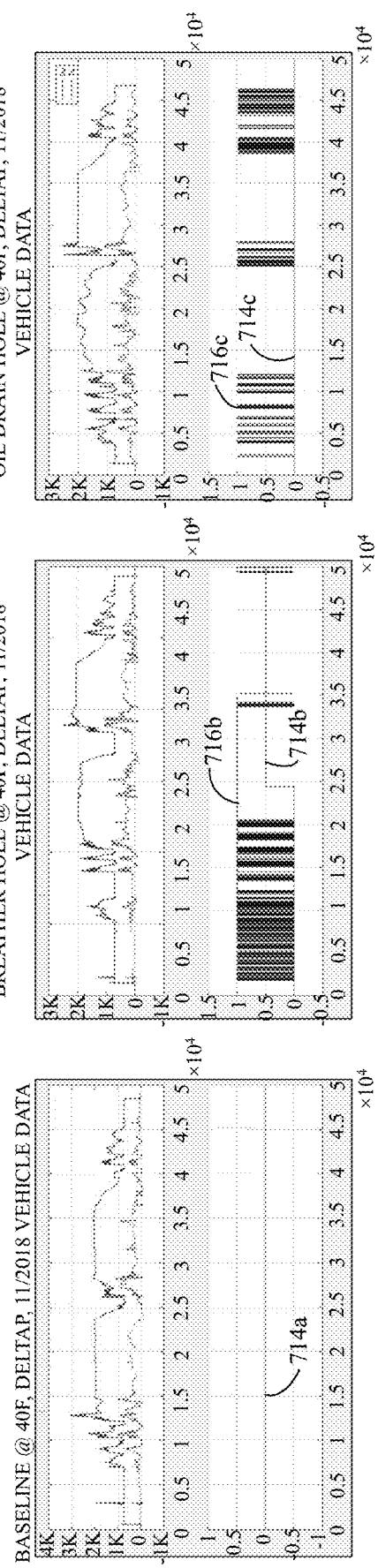

SYSTEMS AND METHODS FOR HOLE DETECTION IN CRANKCASE VENTILATION TUBING

TECHNICAL FIELD

The present disclosure relates to hole detection in crankcase ventilation (CCV) tubing. More particularly, the present disclosure relates to systems and methods for using difference in pressure to detect holes in a CCV system.

BACKGROUND

Emissions from vehicles and engines are subject to various regulations. Some of these regulations mandate on-board diagnostics (OBD) technology to be integrated in the vehicles. The OBD technology allows for diagnosis of defects in the vehicle that lead to violations of one or more vehicle emission regulations. As the vehicle emission regulations change, new vehicles are expected to comply with the new regulations. In many cases, new vehicles are expected to have new OBD technology to comply with the new regulations.

SUMMARY

One embodiment relates to a controller for diagnosing malfunctioning in a crankcase ventilation (CCV) system. The controller can include a processor and a memory storing executable instructions. The executable instructions, when executed by the processor, can cause the processor to receive a plurality of pressure values. The plurality of pressure values can include (i) a first pressure value indicative of a pressure of gases flowing between a crankcase and a breather assembly of a vehicle, (ii) a second pressure value indicative of a pressure of gases flowing through a CCV tube from the breather assembly, and (iii) a third pressure value indicative of a pressure of gases flowing in a tube connected to the CCV tube. The processor can calculate a pair of pressure differences. The pair of pressure differences can include a first pressure difference between the first pressure value and the second pressure value and a second pressure difference between the first pressure value and the third pressure value. The processor can determine that the pair of pressure differences falls within a predefined clustering region, and detect a malfunctioning in the CCV system based on the pair of pressure differences falling within the predefined clustering region.

Another embodiment relates to a method of diagnosing malfunctioning in a crankcase ventilation (CCV) system. The method can include obtaining a plurality of pressure values. The plurality of pressure values can include (i) a first pressure value indicative of a pressure of gases flowing between a crankcase and a breather assembly of a vehicle, (ii) a second pressure value indicative of a pressure of gases flowing through a CCV tube from the breather assembly, and (iii) a third pressure value indicative of a pressure of gases flowing in a tube connected to the CCV tube. The method can include calculating a pair of pressure differences. The pair of pressure differences can include a first pressure difference between the first pressure value and the second pressure value and a second pressure difference between the first pressure value and the third pressure value. The method can include determining that the pair of pressure differences falls within a predefined clustering region, and detecting a malfunctioning in the CCV system based on the pair of pressure differences falling within the predefined clustering region.

Another embodiment relates to a system including a crankcase ventilation (CCV) system) and a controller coupled to the crankcase ventilation system. The controller can be configured to receive a plurality of pressure values including (i) a first pressure value indicative of a pressure of gases flowing between a crankcase and a breather assembly of a vehicle, (ii) a second pressure value indicative of a pressure of gases flowing through a CCV tube from the breather assembly, and (iii) a third pressure value indicative of a pressure of gases flowing in a tube connected to the CCV tube. The controller can calculate a pair of pressure differences. The pair of pressure differences can include a first pressure difference between the first pressure value and the second pressure value and a second pressure difference between the first pressure value and the third pressure value. The controller can determine that the pair of pressure differences falls within a predefined clustering region, and detect a malfunctioning in the CCV system upon determining that the pair of pressure differences falls within the predefined clustering.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 8A-8F show experimental results for three different scenarios, according to an example embodiment.

DETAILED DESCRIPTION

Following below are more detailed descriptions of various concepts related to, and implementations of, methods, apparatuses, and systems for the detection of holes in crankcase ventilation (CCV) systems, such as closed-CCV tubing. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various embodiments disclosed herein relate to systems, apparatuses, and methods for detecting holes in crankcase ventilation (CCV) systems and, particularly closed-CCV tubing, of vehicles. Specifically, the various embodiments disclosed herein relate to systems, apparatuses, and methods for using differences in pressure measurements to detect holes in CCV systems.

On-board diagnostic (OBD) regulations for crankcase ventilation (CCV) require vehicles to be equipped with a system capable of detecting a CCV system malfunction (e.g., of a hose that transports crankcase gases). Specifically, the new OBD regulations for CCV require on-board capability for detection of holes having a size equal to or greater than the smallest inside diameter of any external tubes that run from the breather assembly back either into the crankcase, into the engine or into the compressor inlet. The new regulations also require the detection of the hole or crack to be made within a driving time period. Specifically, the detection needs to be made with five minutes of driving the vehicle.

Most vehicles are already equipped with pressure sensors arranged at respective tubes connected to the breather assembly. In the current disclosure, systems, apparatuses and methods make use of pressure measurements of the pressure sensors to detect malfunction of tubes transporting crankcase gases. Specifically, the systems, apparatuses and methods described herein use pressure differences to detect holes or fissures transporting gases from the breather assembly back to crankcase, the engine or the compressor inlet. Comparing simulation or experimental training data representing pressure differences for tubes with no holes to corresponding data for tubes with various orifice diameters reveals that pressure differences can be used as a criterion to distinguish malfunctioning tubes from undamaged tubes. In particular, the training data depicts a clustering pattern that can form the basis for detecting malfunctioning tubes.

Figure 1:
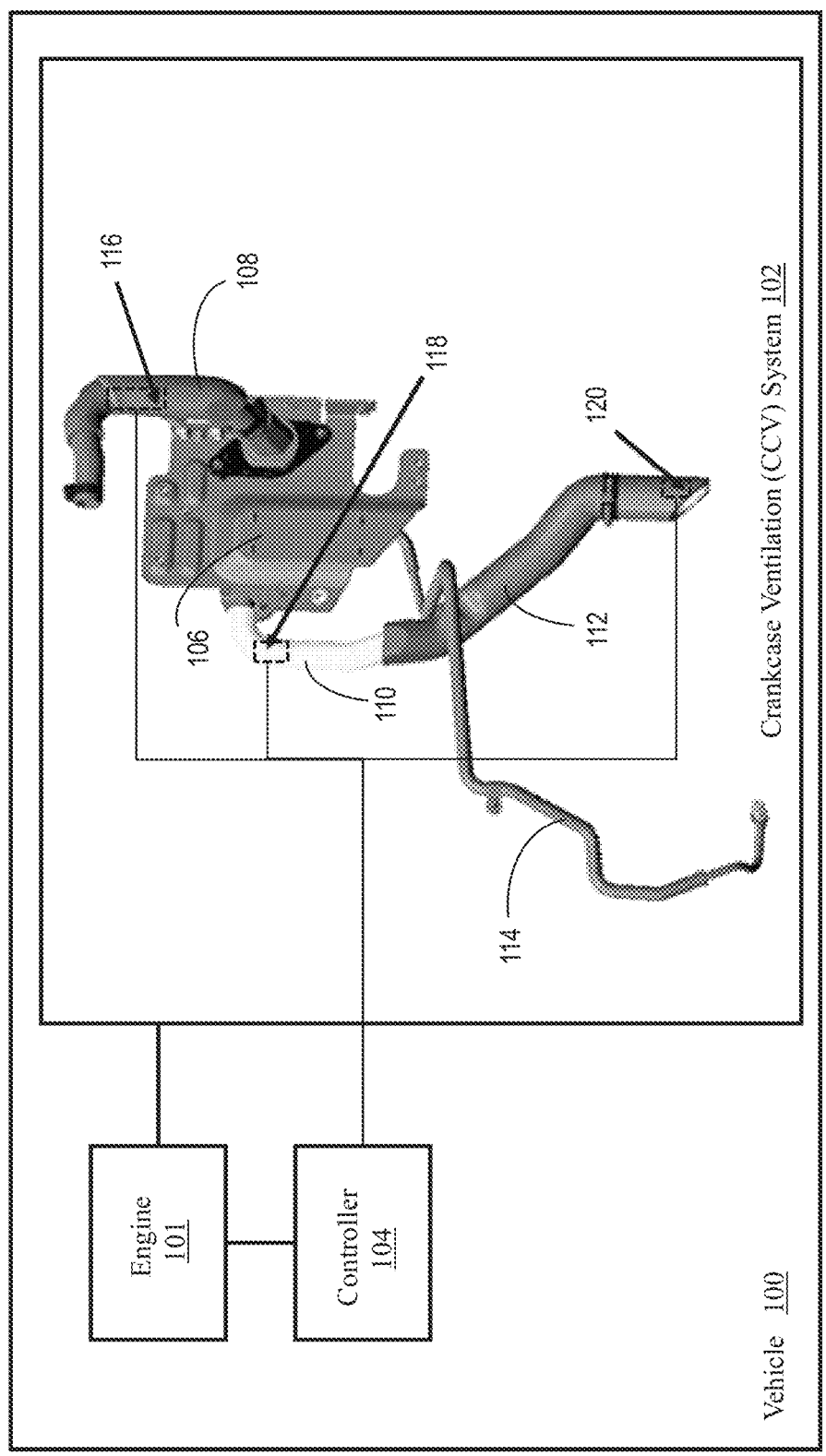
FIG. 1 is a block diagram of a vehicle employing a crankcase ventilation system, according to an example embodiment.

Referring now to FIG. 1, a block diagram of a vehicle 100 employing on-board detection of a malfunctioning crankcase ventilation (CCV) system is shown, according to an example embodiment. The vehicle 100 is shown to include a CCV system 102, and a controller 104 communicatively coupled to the CCV system 102. The vehicle 100 can be any type of on-road or off-road vehicle including, but not limited to, line-haul trucks, mid-range trucks (e.g., pick-up truck, etc.), sedans, coupes, tanks, airplanes, boats, and any other type of vehicle. Based on these configurations, various additional types of components may also be included in the system, such as a transmission, one or more gearboxes, pumps, actuators, and so on.

The vehicle is shown to include an engine 101. The engine 101 may be any type of internal combustion engine. Thus, the engine 101 may be a gasoline, natural gas, or diesel engine, a hybrid engine (e.g., a combination of an internal combustion engine and an electric motor), and/or any other suitable engine. Here, the engine 101 is a diesel-powered compression-ignition engine.

The CCV system 102 is coupled to or included with the engine 101. The CCV system is structured to filter or at least partly remove accumulated blowby in the crankcase of the engine 101. Blowby refers to accumulated fuel and oil. Blowby accumulates in the crankcase through, in one way, leakage around the pistons of the engine. The accumulation in the crankcase may adversely affect performance of the engine by causing a loss of lubrication and contributing to unwanted emissions, such as particulate matter emissions. The CCV system 102 is structured to remove at least some of the blowby from the crankcase.

The CCV system 102 includes a breather assembly 106 and a first tube or hose 108 connecting a crankcase (not shown in FIG. 1) to the breather assembly 102. The CCV system 102 can include a CCV tube or hose 110 connected at one end to the breather assembly 106, and a draft tube or hose 112 connecting a second end of the CCV tube 110 back to the crankcase, the engine 101 or the compressor inlet. The CCV system 102 may also include an oil drain tube or hose 114 connecting the breather assembly 102 to an oil pan (not shown in FIG. 1). The CCV system 102 can include a first pressure sensor 116 arranged at the first tube 108, a second pressure sensor 118 arranged at the CCV tube 110, and a third pressure sensor 120 arranged at the draft tube 112. In some implementations, the CCV system 102 may include one or more other pressure sensors (not shown in FIG. 1) arranged at the oil drain tube 114. The CCV system 102 may also include other components, such as one or more valves.

As exhaust gases pass through the crankcase, they can pick up droplets of oil from the oil in the oil pan. As such, crankcase gases coming out of the crankcase through the first tube 108 can include both exhaust gases and droplets of oil. The breather assembly 106 can include a filter for filtering out the oil droplets from the cranky gases. The filtered gases are then channeled from the breather assembly 106 back to the crankcase, the engine 101 or into the compressor inlet through the CCV tube 110 and the draft tube 112. The oil drain tube 114 transports oil accumulated from filtered out oil droplets from the breather assembly 106 back to the oil pan. The CCV system in some vehicles may not include the oil drain tube 114.

The controller 104 is communicatively coupled to the pressure sensors 116, 118 and 120. The pressure sensors 116, 118, and 120 may be real or virtual. A virtual sensor is logic that may be utilized by the controller 104 to determine or estimate a value (e.g., pressure in this case). Real sensors are physical sensors that determine, measure, or otherwise estimate various values (e.g., pressure). As shown and in this embodiments, the pressure sensors 116, 118, and 120 are real sensors. In other embodiments, one or all of these sensors are virtual.

The pressure sensor 116 is configured or structured to measure or determine the pressure of crankcase gases flowing from the crankcase to the breather assembly 106 through the first tube 108. The pressure sensor 118 is configured or structured to measure or determine the pressure of gases flowing through the CCV tube 110 from the crankcase to the breather assembly 106, and the pressure sensor 120 is configured or structured to measure determine a gas pressure through the draft tube 112. In some implementations, the controller 104 may be communicatively coupled to other pressure sensors, such as pressure sensors (not shown in FIG. 1) arranged to measure gas pressure in the oil drain tube 114. The controller 104 can use pressure measurements or estimations obtained from the pressure sensors 116, 118 and 120 to detect holes or fissures, if any, in the CCV tube 110 or in the draft tube 112. The controller 104 may also use pressure measurements from other pressure sensors arranged at the oil drain tube 114 to detect any holes or cracks therein. The controller 104 can be communicatively coupled to a dashboard of the vehicle 100. Upon detecting a hole or crack in the CCV system 102, the controller 104 can send a signal indicative of the detected hole or crack to the dashboard of the vehicle 100 or a display thereof. The dashboard or the respective display can display an alert or warning signal indicative of the detected hole or crack (e.g., a malfunctioning indicator lamp). Alternatively or additionally, a fault code may be generated and set based on a detected hole or crack.

The CCV system 102 depicted in FIG. 1 may differ from one vehicle to another. For example, in some vehicles, the CCV system 102 may not include the oil drain tube 114. Also, the number and the locations of the pressure sensors used may vary from one vehicle to another. However, many vehicles include the pressure sensors 116, 118 and 120 as described herein. That is, many vehicles include the first tube 108, the CCV tube 110 and the draft tube 112 and pressure sensors arranged therein to measure gas pressure through these tubes.

As the components of FIG. 1 are shown to be embodied in the vehicle 100, the controller 104 may be structured as one or more electronic control units (ECU). The controller 104 may be separate from or included with at least one of a transmission control unit, an exhaust aftertreatment control unit, a powertrain control module, an engine control module, etc. The function and structure of the controller 104 is described in greater detail in FIGS. 2, 4 and 5A-5C.

Figure 2:
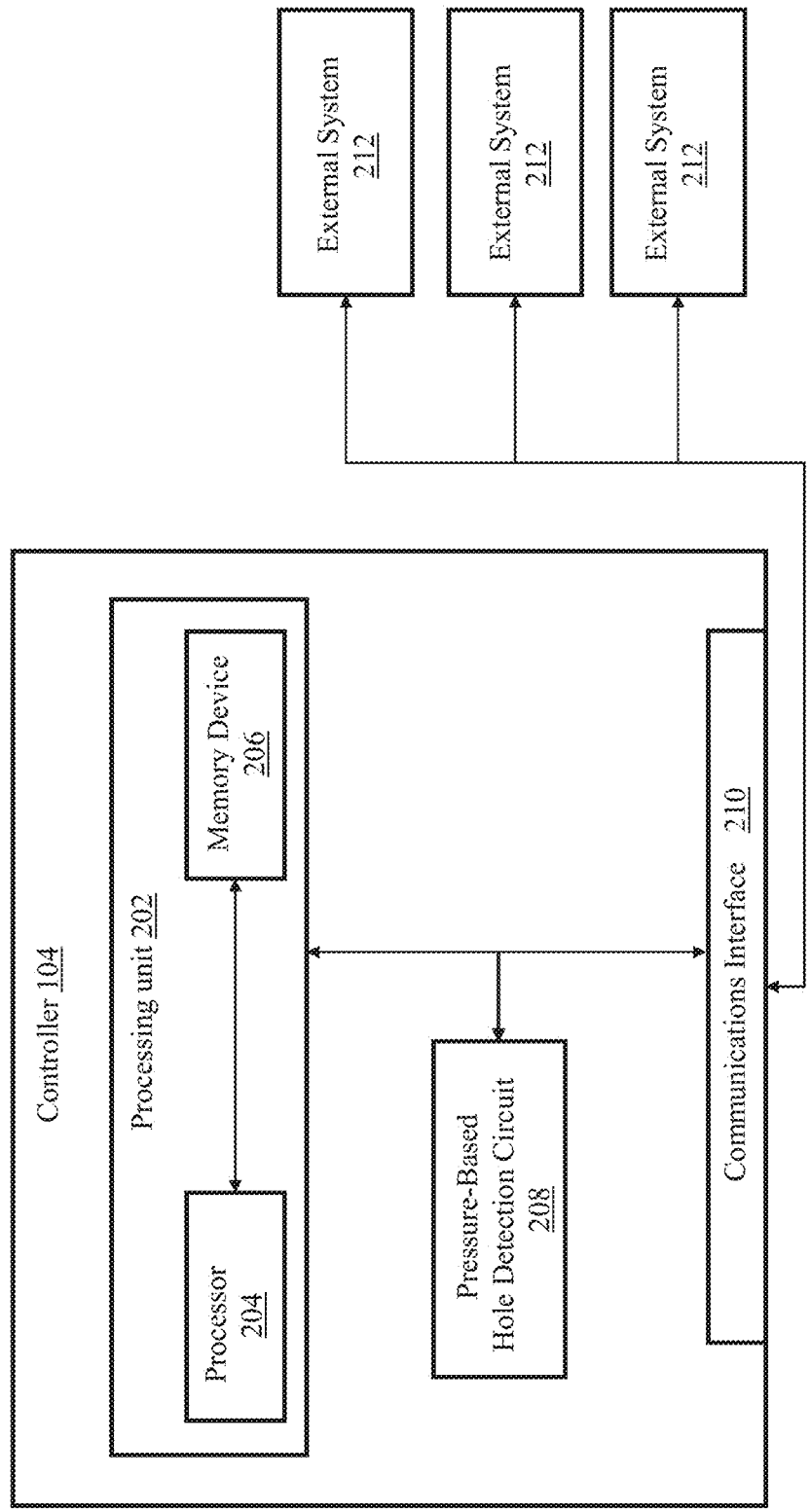
FIG. 2 is an block diagram of a hole detection system, according to an example embodiment.

Referring now to FIG. 2, a schematic diagram of the controller 104 of the vehicle 100 of FIG. 1 is shown according to an example embodiment. As shown in FIG. 2, the controller 104 includes a processing circuit 202 having a processor 204 and a memory device 206, a pressure-based hole detection circuit 208 and a communications interface 210. The controller 104 can be structured to receive crankcase pressure (CCP) measurements, CCV pressure measurements and compressor inlet pressure (CIP) measurements from the pressure sensors 116, 118 and 120, respectively, and compute pressure differences CCP and CCV pressure measurements and pressure differences between CCP and CIP measurements. The controller 104 can detect holes or cracks, if any, in the tubes of the CCV system 102 using the computed pressure differences CCP–CCV pressure and CCP–CIP. In response to detecting a hole or crack in the tubes of the CCV system 102, the controller 104 can be structured to send an alert or warning signal indicative of the detected hole or crack to a dashboard or a display thereof of the vehicle 100.

In one configuration, the pressure-based hole detection circuit 208 can be embodied as machine or computer-readable media storing instructions that is executable by a processor, such as the processor 204. As described herein and amongst other uses, the machine-readable media facilitates performance of certain operations to enable reception and transmission of data. For example, the machine-readable media may provide an instruction (e.g., command) to, e.g., acquire data. In this regard, the machine-readable media may include programmable logic that defines the frequency of acquisition of the data (or, transmission of the data). The computer-readable media may include code, which may be written in any programming language including but not limited to Java or the like and any conventional procedural programming languages, such as the "C" programming language or similar programming languages. The computer-readable program code may be executed on one processor or multiple remote processors. In the latter scenario, the remote processors may be connected to each other through any type of network (e.g., CAN bus).

In another configuration, the pressure-based hole detection circuit 208 may be embodied as one or more circuitry components including, but not limited to, processing circuitry, network interfaces, peripheral devices, input devices, output devices, sensors, etc. In some embodiments, the pressure-based hole detection circuit 208 may take the form of one or more analog circuits, electronic circuits (e.g., integrated circuits (IC), discrete circuits, system on a chip (SOCs) circuits, microcontrollers), telecommunication circuits, hybrid circuits, and any other type of circuit. In this regard, the pressure-based hole detection circuit 208 may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on). The pressure-based hole detection circuit 208 may also include programmable hardware devices such as field programmable gate arrays, programmable array logic, programmable logic devices or the like. The pressure-based hole detection circuit 208 may include one or more memory devices for storing instructions that are executable by the processor(s) of the pressure-based hole detection circuit 208. The one or more memory devices and processor(s) may have the same definition as provided below with respect to the memory device 206 and the processor 204. In some hardware unit configurations, the pressure-based hole detection circuit 208 may be geographically dispersed throughout separate locations in the vehicle 100. Alternatively and as shown, the pressure-based hole detection circuit 208 may be embodied in or within a single unit/housing, which is shown as the controller 104.

In the example shown, the controller 106 includes the processing circuit 202 having the processor 204 and the memory device 206. The processing circuit 202 may be structured or configured to execute or implement the instructions, commands, and/or control processes described herein with respect to pressure-based hole detection (or malfunctioning detection) circuit 208, or to execute instructions stored in the memory device 206. The depicted configuration represents the pressure-based hole detection circuit 208 as a machine or a computer-readable medium. However, as mentioned above, this illustration is not meant to be limiting as the present disclosure contemplates other embodiments where the pressure-based hole detection circuit 208, or at least a component thereof, is configured as a hardware unit. All such combinations and variations are intended to fall within the scope of the present disclosure.

The processor 204 may be implemented or performed with a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., pressure-based hole detection circuit 208 or components thereof may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multithreaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 210 can be a circuit that enables the controller 104 to communicate with other devices or systems in the vehicle 100. For instance, the communication interface 210 can receive signals indicative of pressure measurements from pressure sensors, such as the pressure sensors 116, 118 and 120. The communications interface 210 can be coupled to various external systems 212. The external systems 212 can include the pressure sensors, such as the pressure sensors 116, 118 and 120. The external systems 212 can include a dashboard, or a respective display, of the vehicle 100. The external systems 212 can include a switch of the vehicle 100 configured to enable or disable processes described herein. The external systems 212 can include the engine 101 of the vehicle 100.

The communication interface 210 can include a plurality of communication ports. For example, each communication port can be coupled to a respective external system 212 of the plurality of external systems 212. For example, the communication interface 210 can include a communication port coupled to the pressure sensor 116, a communication port coupled to the pressure sensor 118, a communication port connected to the pressure sensor 120, a communication port coupled to the dashboard (or respective display) and a communication port coupled to the switch configured to enable or disable processes described herein. In some implementations, the communication interface 210 can include a single port coupled to all the external systems 212.

In this regard, components of the vehicle 100 may communicate with each other or foreign components (e.g., a remote operator) using any type and any number of wired or wireless connections. Communication between and among the controller 104 via the communication interface 210 and the components of the vehicle 100 may be via any number of wired or wireless connections (e.g., any standard under IEEE 802). For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The external systems 212 can include pressure sensors, such as pressure sensors 116, 118 and 120. In some implementations, the pressure sensors can be configured to measure pressure in the corresponding tubes, and send the pressure measurements to the controller 104 on a regular basis. For example, the pressure sensors can take pressure measurements and send them to the controller 104 every fraction of a second, every second, or every few seconds. In some implementations, the pressure sensors can be synchronized to obtain and send pressure measurements to the controller 104 simultaneously or at predefined time instances. For example, the controller 104 can repeatedly send timed requests for pressure measurements to each of the pressure sensors. The controller 104 may send synchronization instructions (e.g., instructions indicative of pressure measurements timing) to each of the pressure sensors. In some implementations, the pressure sensors can be configured to measure pressure in the corresponding tubes, and send the pressure measurements to the controller 104 over a predefined time duration each time the vehicle is started or starts to drive.

The external systems 212 can include a dashboard or a respective display device of the vehicle 100. The controller 104 can send a signal indicative of a detected hole or crack in the CCV tubing to the dashboard (or the respective display device) of the vehicle 100. The signal may be indicative of whether or not a hole or crack is detected, a tube where the hole or crack, if any, is detected, or a combination thereof. The dashboard or the respective display device can display a visual representation indicative of a defect or detected hole or crack in the CCV tubing. In some implementations, the visual representation may indicate in which tube the hole or crack is detected.

The external systems 212 coupled to the controller 106 can include a switch for enabling or disabling processes described herein. In some implementations, the switch can be actuated via a user interface (UI) associated with the dashboard, or can be implemented as a manual switch. The switch can allow the driver of the vehicle to control when to enable or disable processes executed by the controller. In some implementations, the switch can be configured to enable or disable the controller 104, all processes executed by the controller or a subset of the processes executed by the controller 104.

In some implementations, the pressure-based hole detection circuit 208 can preprocess signals received by the communication interface 210 from the pressure sensors. For instance, the pressure-based hole detection circuit 208 can transform received analog signals into digital data representing the corresponding pressure measurements. The pressure-based hole detection circuit 208 can compute differences between the pressure measurements received from the pressure sensors. In some implementations, the pressure-based hole detection circuit 208 can perform all or part of the processing steps to detect holes or cracks in the closed-CCV tubing described below in relation with FIG. 4. For instance, the pressure-based hole detection circuit 208 can receive signals from the pressure sensors, compute pressure differences, and provide the pressure differences to the processing unit 202 or the processor 204.

Figure 3A:
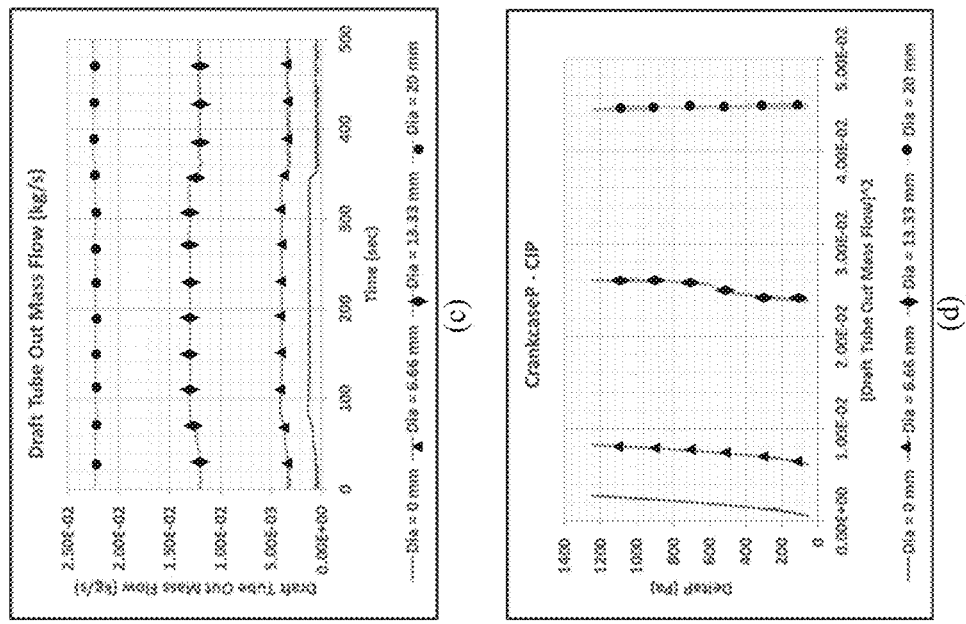
FIGS. 3A and 3B show simulation results illustrating plots of pressure and pressure differences for four different orifice diameters, according to an example embodiment.
Figure 3B:
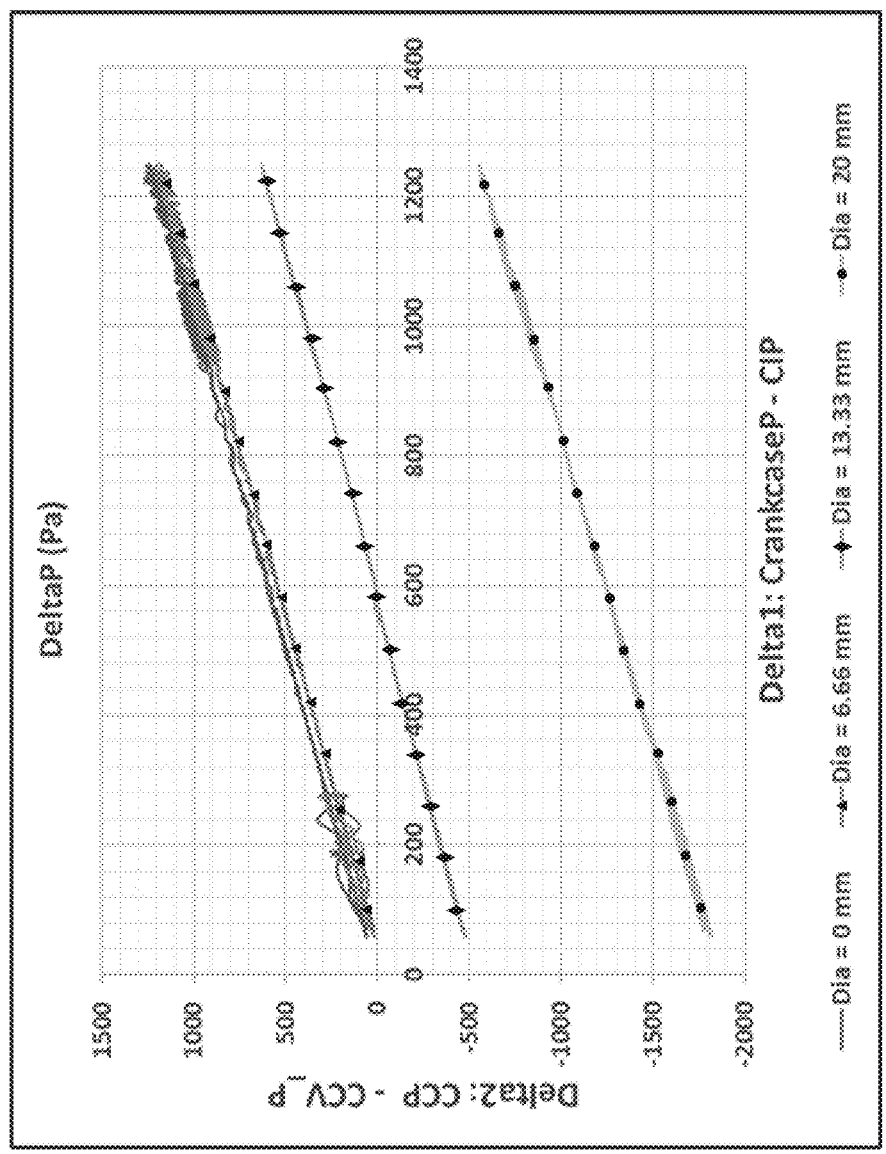

FIGS. 3A and 3B show simulation results illustrating plots of pressure, output mass flow, and pressure differences for four different scenarios associated with the closed-CCV tubing, according to an example embodiment. The four scenarios correspond to, respectively, a closed-CCV tubing with no holes, a closed-CCV tubing having an orifice with a diameter equal to 6.66 millimeters (mm), a closed CCV-tubing having an orifice with a diameter equal to 13.33 mm, and a closed-CCV tubing having an orifice with a 20 mm diameter. The orifices or holes are located in the draft tube 112. Plots shown as continuous lines represent simulation data for the no-hole closed-CCV tubing. Plots shown as continuous lines with dark triangles represent simulation data for the closed CCV tubing having a 6.66 mm orifice. Plots shown as continuous lines with dark diamonds represent simulation data for the closed CCV tubing having a 13.33 mm orifice. Plots shown as continuous lines with dark circles represent simulation data for the closed CCV tubing having a 20.00 mm orifice.

FIG. 3A shows four graphs denoted as (a), (b), (c) and (d). Graph (a) shows plots representing simulation crankcase pressure (CCP) measurements generated by the pressure sensor 116 for the four different scenarios. Graph (b) shows plots representing simulation CCV pressure measurements generated by the pressure sensor 118 for the four different scenarios. The CCP plots for the four different closed-CCV tubings have substantially similar shapes and overlap on each other significantly, which makes it hard to distinguish one plot from another. Neither the existence of the hole nor the size of the hole seem to have a meaningful impact on the simulation CCP data. In contrast, the CCV pressure shown in graph (b) seems to increase with the size of the hole. In fact, the CCV pressure gets closer and closer to the ambient pressure as the diameter of the hole increases. For instance, all the CCV pressure measurements for the 20.00 mm hole are greater than 99 Kilo Pascal (KPa) and are very close to the ambient pressure, which is about 100 KPa. The CCV pressure plot for the 6.66 mm hole, on the other hand, is very close to the CCV pressure plot for the no-hole closed-CCV tubing.

Graph (c) shows plots of simulation air mass flow through the draft tube 112, as a function of time, for the four different scenarios. Graph (d) shows plots of pressure differences between CCP and CIP, as a function of air mass flow through the draft tube 112, for the four different scenarios. The plots in both graphs show that the existence of a hole in the closed-CCV tubing results in higher air mass flow compared to air mass flow for no-hole scenario. Also, as the size of the hole increases so does the air mass flow.

FIG. 3B shows plots of pressure difference between CCP and CCV pressure, as a function of pressure difference between CCP and CIP, for the four different scenarios. The four plots for the four scenario exhibit a linear-like behavior. The CCP minus CCV pressure plots for the no-hole and the 6.66 mm hole scenarios are very close to each other. However, the corresponding plots for the 13.33 mm hole and the 20.00 mm hole scenarios are far apart from each other and from the plots for the no-hole and the 6.66 mm hole scenarios.

Figure 4C:
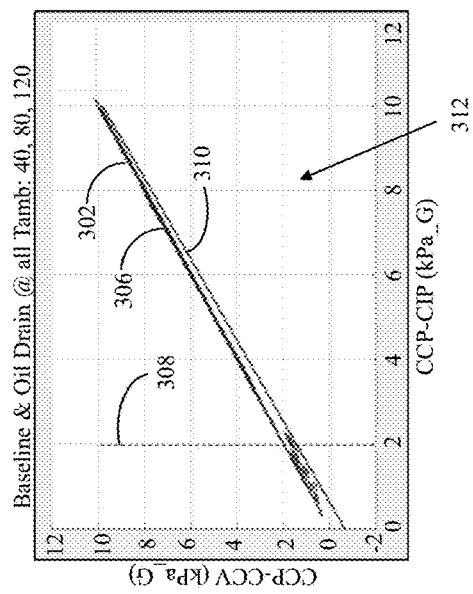
FIGS. 4A-4C show plots of simulated pressure differences for three different scenarios, according to an example embodiment.
Figure 4B:
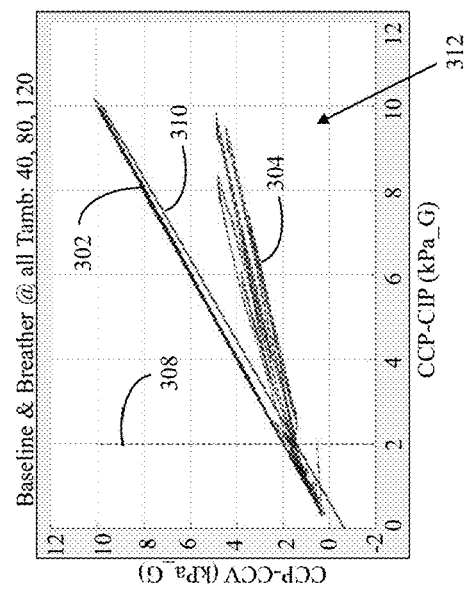
Figure 4A:
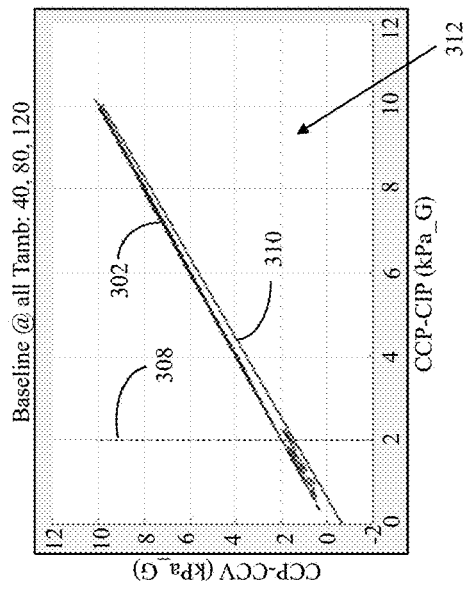

FIGS. 4A-4C show plots of simulation pressure differences for three different scenarios. Specifically, FIGS. 4A-4C show the simulation pressure difference between CCP and CCV pressure, as a function of the simulation pressure difference between CCP and CIP, for the three different scenarios. Note that CCP is obtained by the pressure sensor 116, CCV pressure is obtained by pressure sensor 118, and CIP is obtained by pressure sensor 120. The x-axis in all these figures represents the pressure difference between CCP and CIP, while the y-axis represents the pressure difference between CCP and CCV pressure. The plot 302 represents pressure difference data for a simulated no-hole CCV tubing, and the plot 304 represents pressure difference data for a simulated CCV tubing with a 20.00 mm hole in the CCV tube 110. The plot 306 represents pressure difference data for a simulated CCV tubing with a 20.00 mm hole in the oil drain tube 114. The lines 308 and 310 are artificial lines. The term "ba" in FIGS. 4A-4C refer to the "baseline" scenarios with no holes but different ambient temperatures. The term "br" refers to "breather tube" and is indicative of scenarios with a hole in the CCV tube 110 at different ambient temperatures. The "od" term refers to "oil drain tube" and is indicative of scenarios with a hole in the drain tube 114 at the different ambient temperatures.

While plots 302 and 304 are significantly different from each other, plots 302 and 306 seem to be similar to each other. Specifically, plot 304 is different from plot 302 with respect to the shape and location within the two-dimensional (2-D) plane defined by the x-axis and y-axis. However, plots 302 and 306 seem to be similar in shape and they overlap on each other almost perfectly. The simulation results shown in FIGS. 4A-4C illustrate that the pressure difference between CCP and CCV pressure and the pressure difference between CCP and CIP reflect the existence or absence of a hole or crack in the CCV tube 110 or the draft tube 112. In contrast, the same pressure difference data are invariant (or almost invariant) to the existence or absence of a hole or crack in the oil drain tube 114. Hence, the controller can use the pressure difference between CCP and CCV pressure and the pressure difference between CCP and CIP to detect holes or cracks in the CCV tube 110 or the draft tube 112. In fact, the lines 308 and 310 represent a separation between the clustering region associated with defective CCV tube or defective draft tube and the clustering region associated with normal CCV and draft tubes. Specifically, the lower right region 312 (to the right of line 308 and below line 310) represents a clustering region of pairs of pressure difference values (CCP–CCV pressure, CCP–CIP) associated with a defective CCV tube or defective draft tube. As such, the clustering region 312 can be viewed as indicative of a defective CCV tube or defective draft tube, or more generally a malfunctioning CCV system 102. The remaining region (other than region 312) can be viewed as indicative of a non-defective CCV system 102.

The lines 308 and 310 can be determined, e.g., by a computing device (a remote computing system) or by the controller 104, using training pressure data (e.g., corresponding to non-defective CCV system 102 and/or malfunctioning CCV system 102). The computing device or the controller 104 may use training data corresponding to a defective CCV tube 110 (e.g., having a hole or crack) and/or a defective draft tube 112 (e.g., having a hole or crack) to determine the lines 308 and 310. The training data can be simulation data or actual pressure data. The lines 308 and 310 can be defined to be adjacent to, but not intersecting, training pressure difference points associated with non-defective CCV and draft tubes 110 and 112. FIGS. 4A-4C define the boundary of the clustering regions corresponding to defective and non-defective CCV and draft tubes 110 and 112 via the lines 308 and 310. In some implementations, the boundary separating both clustering regions can be defined in other ways, such as via one or more nonlinear functions. For example, the boundary between both regions can be defined in terms of a nonlinear function having the lines 308 and 310 as asymptotic limits.

Figure 5:
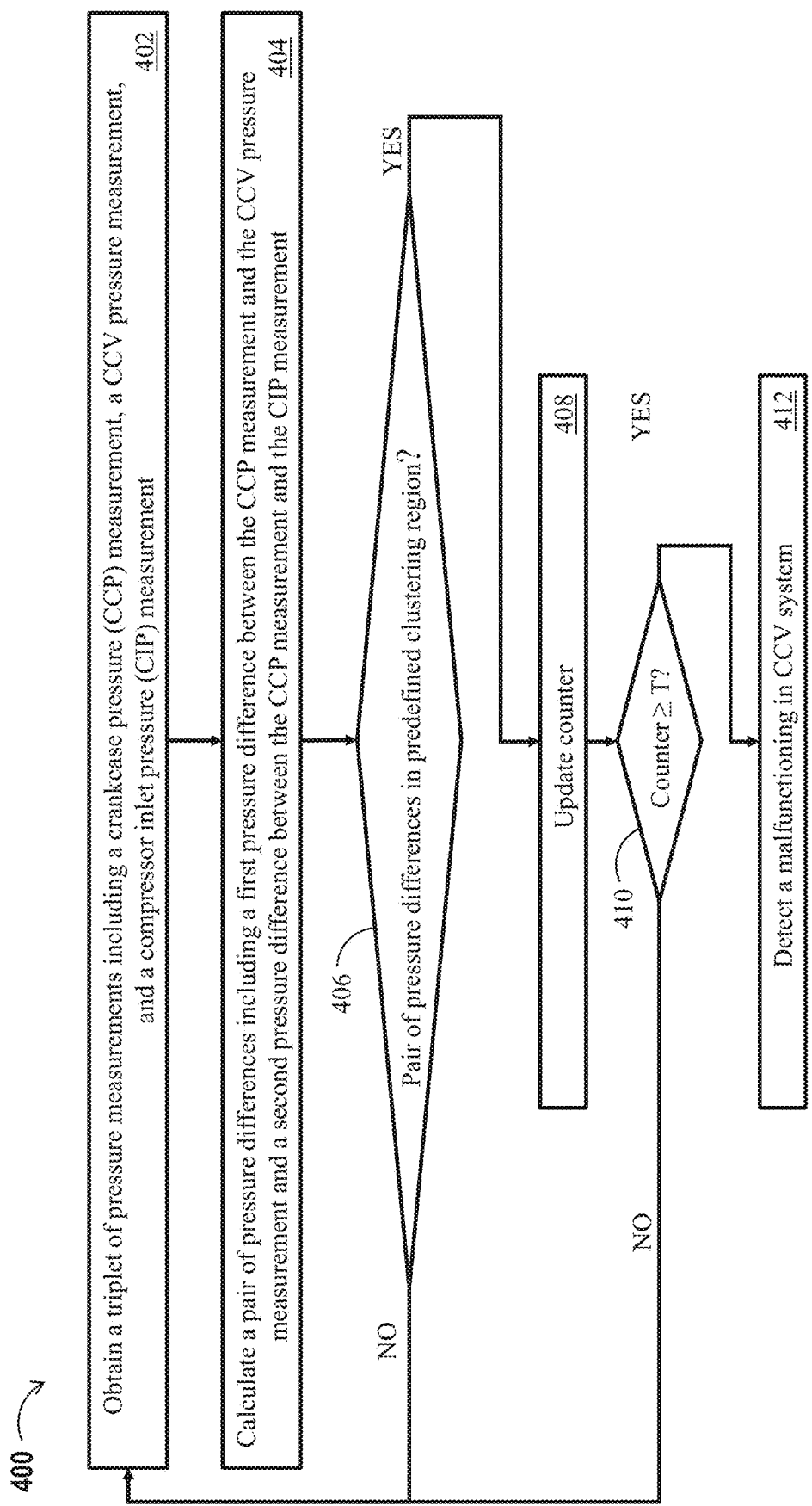
FIG. 5 shows a flowchart illustrating a method of detecting holes or cracks in a CCV system, according to an example embodiment.

FIG. 5 shows a flowchart illustrating a method 400 of detecting holes or cracks in a CCV system, according to inventive concepts of the current disclosure. As a brief overview, the method 400 includes obtaining measurements of CCP, CCV pressure and CIP (STEP 402), and calculating a first pressure difference between the CCP measurement and the CCV pressure measurement, and a second pressure difference between the CCP measurement and the CIP measurement (STEP 404). The method 400 further includes determining whether the pair of first and second pressure differences falls within a predefined clustering region or satisfy one or more predefined conditions (DECISION BLOCK 406), and updating a counter T if the pair of first and second pressure differences is determined to fall within the predefined clustering region or satisfy the one or more predefined conditions (STEO 408). The method 400 includes checking whether the counter T reaches or exceeds a predefined threshold (DECISION BLOCK 410), and detecting a malfunctioning or defect (e.g., hole or crack) in the CCV system if the counter T reaches or exceeds the predefined threshold (STEP 412).

The method 400 includes the controller 104 obtaining measurements of CCP, CCV pressure and CIP (STEP 402). The controller 104 can receive the CCP, CCV pressure and CIP measurements as signals from the pressure sensors 116, 118 and 120, respectively. The pressure sensors 116, 118 and 120 can generate and send respective pressure measurements to the controller 104 on a regular basis, e.g., every fraction of a second, every second, or every few seconds. The pressure sensors 116, 118 and 120 can generate and send the respective pressure measurements responsive to requests from the controller 104. The pressure sensors 116, 118 and 120 can generate and send the respective pressure measurements in a synchronized manner.

The method 400 includes the controller 104 calculating a first pressure difference between the CCP measurement and the CCV pressure measurement, and a second pressure difference between the CCP measurement and the CIP measurement (STEP 404). In some implementations, the signals received from the pressure sensors 116, 118 and 120 can be analog signals, and the controller 104 can transform the received analog signals into corresponding digital signals or numbers. The controller 104 subtracts the CCV pressure measurement from the CCP measurement to determine the first pressure difference CCP–CCV pressure. The controller 104 also subtracts the CIP measurement from the CCP measurement to determine the second pressure difference CCP–CIP.

The method 400 includes the controller 104 determining whether the pair of first and second pressure differences falls within a predefined clustering region or satisfy the one or more predefined conditions (DECISION BLOCK 406). The controller 104 can compare the pair of first and second pressure differences to one or more threshold values or expressions to determine whether or not the pair of first and second pressure differences falls within the predefined clustering region. For instance, the controller 104 compares the second pressure difference CCP–CIP to a threshold value associated with the lime 308. For example, if the line 308 is defined as x=a, the controller 104 compares the second pressure difference CCP–CIP to the constant a. Also, if the line 310 is defined as y=b×x+c, where b and c are constant coefficients, the controller 104 compares the expression b×(second pressure difference)+c to the constant coefficient the first pressure difference. The controller 104 can determine that the pair of first and second pressure differences falls within the predefined clustering region if b×(second pressure difference)+c>first pressure difference and the second pressure difference >a. The predefined condition(s) can include one or more inequalities defining the predefined clustering region.

In some implementations where the boundary separating the clustering region associated with defective CCV tube and/or defective draft tube and the clustering region associated with non-defective CCV and draft tubes is defined via a two-dimensional function $f(x,y)=\alpha$, the controller 104 compares $f$ (second pressure difference, first pressure difference) to the constant $\alpha$, to determine whether or not the pair of first and second pressure differences falls within the predefined clustering region. In determining whether or not the pair of first and second pressure differences falls within the predefined clustering region, the controller 104 performs one or more comparisons using the first and second pressure differences.

The method 400 includes the controller 104 updating a counter T if the pair of first and second pressure differences is determined to fall within the predefined clustering region or satisfy the one or more predefined conditions (STEO 408). In some implementations, the controller 104 can detect a hole in the CCV tube 110 or the draft tube 112 if the pair of first and second pressure differences falls within the predefined clustering region for a predefined time period. That is, the controller 104 can use a plurality of consequent triplets of CCP, CCV pressure and CIP measurements, and check if the corresponding pairs of first and second pressure differences fall within the predefined clustering region or satisfy the one or more conditions for the predefined time period. Each time the controller determines that a pair of first and second pressure differences falls within the predefined clustering region or satisfy the one or more predefined conditions, the controller can increment a time counter T.

The method 400 includes checking whether the counter T exceeds a predefined threshold (DECISION BLOCK 410). In some implementations, each time the counter T is updated, the controller 104 can check whether the counter T exceeds the predefined threshold. The predefined threshold can be indicative of the predefined time period. If the counter T does not exceed the predefined threshold, the controller 104 can return back to STEP 402 to wait for another triplet of CCP, CCV pressure and CIP measurements.

The method 400 can include the controller 104 detecting a malfunctioning or defect (e.g., hole or crack) if the counter T exceeds the predefined threshold (STEP 412). If the controller 104 determines at DECISION BLOCK 410 that the counter T exceeds the predefined threshold, the controller 104 can determine that pairs of first and second pressure differences CCP–CCV pressure and CCP–CIP fall within the predefined clustering region or satisfy the one or more predefined conditions for the predefined time period. As a result, the controller 104 can detect a malfunctioning or defect in the CCV system 102 (e.g., either the CCV tube 110 or the draft tube 112 includes a hole or crack) (STEP 412).

Figure 6:
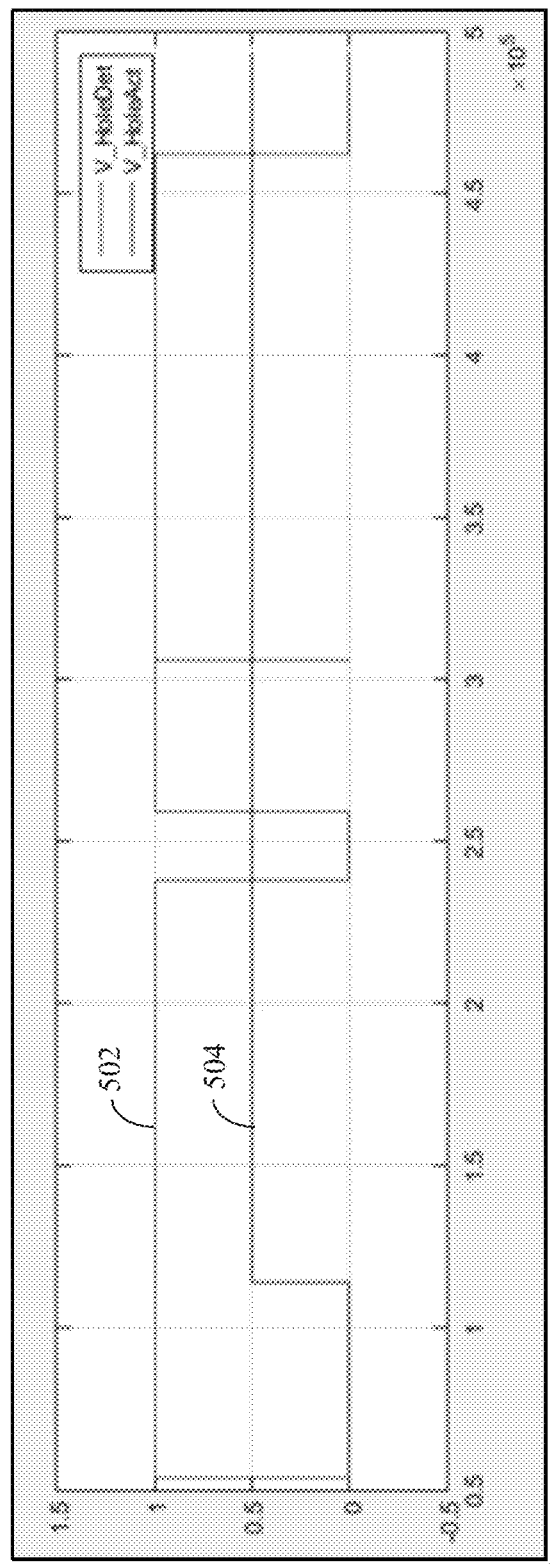
FIG. 6 shows plots of two signals illustrating decisions made in the process of detecting holes in a CCV system.

Referring to FIG. 6, plots of two signals illustrating decisions made in the process of detecting holes in the CCV system 102 of FIG. 1. The signal 502 represents the decision associated with DECISION BLOCK 406. That is, the signal 502 goes to high (e.g., 1) each time the pair of pressure differences CCP–CCV pressure and CCP–CIP is found to fall within the predefined clustering region, and goes to 0 each time the pair of pressure differences is found to be outside the predefined clustering region. The signal 504 represents the decision of detecting a hole in the CCV system 102. The signal 504 goes to high (e.g., 0.5) if a hole is detected, otherwise it is 0. The signal 504 goes to high (e.g., 0.5) if the signal 502 stays at the high level for a predefined time period corresponding to the threshold for the counter T.

Upon detecting a hole or crack, the controller 104 can send a signal indicative of such detection to the dashboard (or corresponding display) of the vehicle 100. The dashboard can present an indication of the hole or crack detection. For instance, the dashboard can present a visual representation, an audio signal or a combination thereof to warn or alert the driver of the vehicle 100 about the detected hole or crack.

In some implementations, the predefined clustering region can be defined within a two-dimensional (2-D) space defined by an x-axis representing the pressure difference between CCP and CIP and a y-axis representing the pressure difference between CCP and CCV pressure, as shown in FIGS. 4A-4C. In some implementations, the 2-D space can be defined by an x-axis representing the pressure difference between CCP and CCV pressure, and a y-axis representing the pressure difference between CCP and CIP. In some implementations, the boundary of the predefined region of the 2-D space associated with a defective CCV tube or a defective draft tube can be defined by one or more linear or nonlinear curves (or functions) or a combination of linear and nonlinear curves (or functions). In some implementations, the clustering of pressure differences can be defined in three-dimensional (3-D), or higher dimensional, space.

Referring to FIGS. 1 and 5, the CCV system 102 can include one or more pressure sensors arranged at the oil drain tube 114. The controller 104 use CCP measurements and pressure measurements from the pressure sensors arranged at the oil drain tube 114 to detect holes or cracks, if any, in the oil drain tube 114. For instance, the controller 104 can use pressure differences between CCP and oil drain pressure measurements, as well as pressure differences between CCP and CCV pressure measurements to detect any holes or cracks in the oil drain tube 114. In the case where there are two pressure sensors arranged at the oil drain tube 114, the controller 104 may use pressure differences between CCP and pressure measurements from a first pressure sensor of the oil drain 114, and pressure differences between CCP and pressure measurements from a second pressure sensor of the oil drain 114 to detect holes or cracks, if any, at the oil drain tube 114. The controller can use a similar detection process similar to method 400.

In some implementations, the controller 104 can update the functions defining the boundary separating the clustering region(s) corresponding to defective tubes and the clustering region(s) corresponding to non-defective tubes over time. For instance, the controller 104 can update the coefficients a, b, and c over time. The controller 104 can update the functions defining the boundary or parameters thereof, such as coefficient a, b and c, based on at least one of mileage on engine 101 of the vehicle 100 or an age of one or more pressure sensors, such as pressure sensors 116, 118 and 120. For example, the controller 104 can include a look-up table storing parameters of the function(s) defining the boundary of the clustering region(s) (or defining the clustering region itself) in terms of the engine mileage, age of engine 101 or vehicle 100, age of pressure sensors used, type of pressure sensors used, or a combination thereof. In some implementations, the controller 104 can use triplets of CCP, CCV pressure and CIP measurements obtained from the pressure sensors 116, 118 and 118, as additional training data to update parameters of the functions defining the 1-D space region or the respective boundary. For example, the controller 104 may reconstruct the boundary of the clustering region(s) based on of pressure differences computed by the controller 104.

Figure 7A:
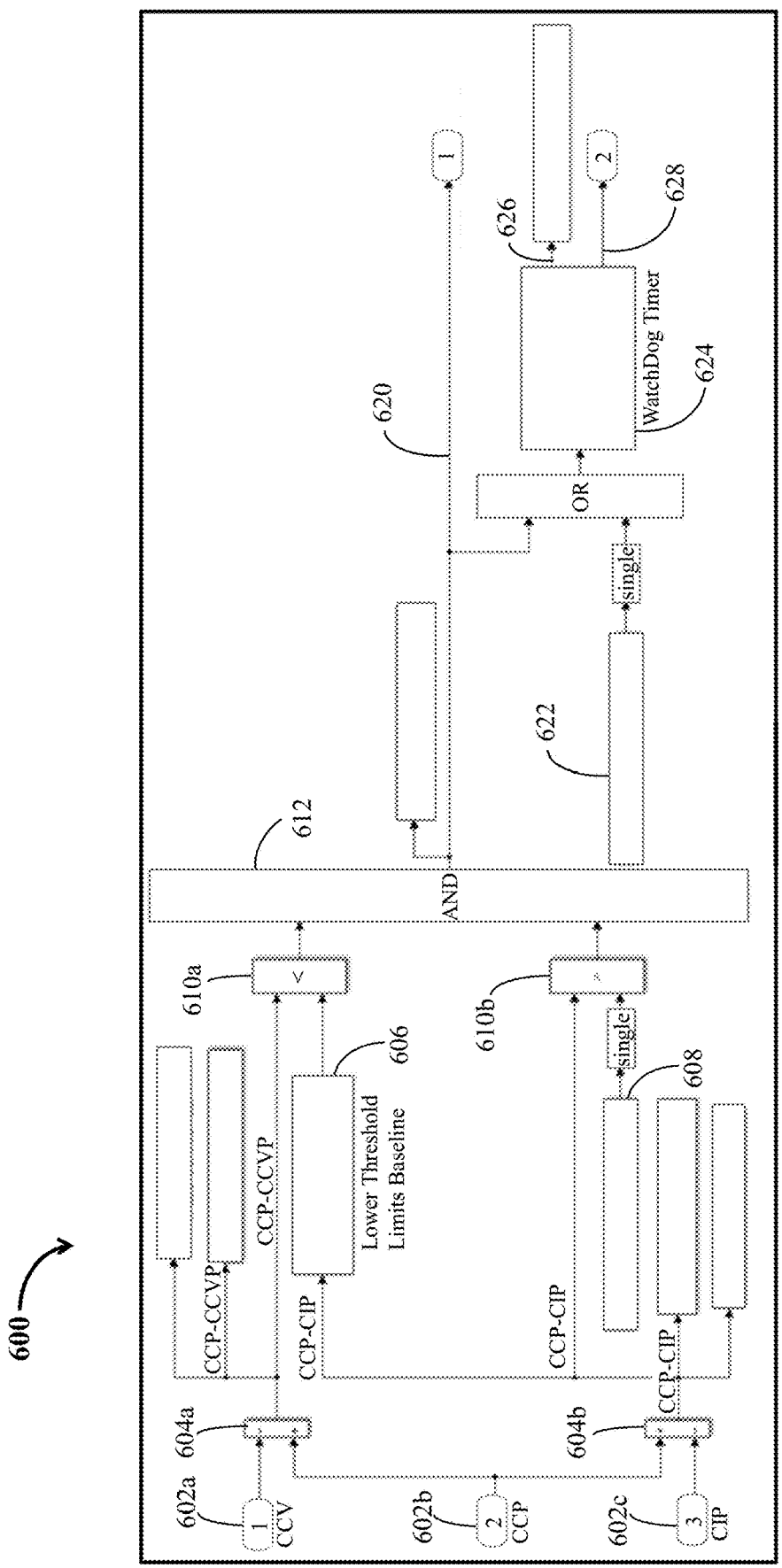
FIGS. 7A-7C show an example logic circuit 600 of the controller 104 or the pressure-based hole detection circuit 208, according to an example embodiment.
Figure 7C:
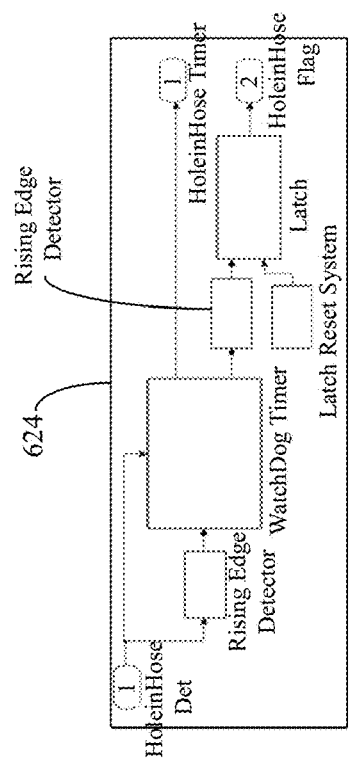
Figure 7B:
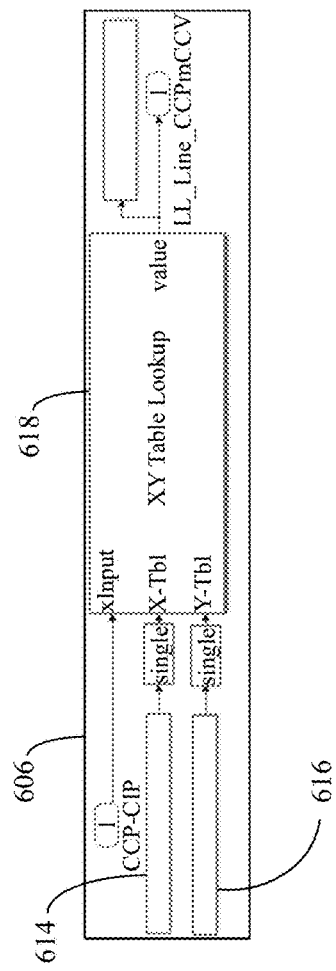

FIGS. 7A-7C show an example logic circuit 600 of the controller 104 or the pressure-based hole detection circuit 208, according to an example embodiment. The logic circuit 600 includes three input leads 602a, 602b and 602c. Input lead 602a receives CCV pressure measurements, input lead 602b receives CCP measurements, and input lead 602c receives CIP measurements. The logic circuit 600 includes two subtractors 604a and 604b. Each of the subtractors 604a and 604b can be a combinatorial circuit for performing subtraction between two numbers. Subtractor 604a subtracts CCV pressure measurements from CCP measurements. Subtractor 604b subtracts CIP measurements from CCP measurements. The subtractors 604a and 604b perform the process in STEP 404 of method 400.

The logic circuit 600 includes the circuit components 606 and 608, the comparator circuits 610a and 610b, and the AND gate 612. The circuit component 606 receives the pressure difference CCP−CIP and calculates the expression b×(CCP−CIP)+c. FIG. 7B shows an example block diagram of the circuit component 606. The circuit component 606 can include a buffer 614 storing the coefficient b and a buffer 616 storing the constant c. The circuit component 606 can include a circuit 618 for implementing a look-up table of the expression b×(CCP−CIP)+c. In some implementations, the circuit 618 can be implemented as one or more multiplier circuits and one or more adder circuits.

The circuit component 608 can be a buffer storing the constant a. The comparator circuit 610a compares the pressure difference CCP−CCV pressure to the output of the circuit component 606. That is, the comparator circuit 610a evaluates whether the comparison (CCP−CCV pressure)<b×(CCP−CIP)+c is true. The comparator circuit 610b evaluates whether the comparison (CCP−CIP)>a is true. The AND gate 612 receives the output of both comparator circuits 610a and 610b as input and outputs digital signal 620 that is high when both comparisons evaluated by the comparator circuits 610a and 610b are true. The combination of the circuit components 606 and 608, the comparator circuits 610a and 610b, and the AND gate 612 perform an example embodiment of the process described in association with the DECISION BLOCK 406.

The logic circuit 600 can include circuit blocks 622 and 624. Circuit block 622 is configured to enable or disable a timer system used for updating the counter T. FIG. 7C shows an example block diagram of circuit block 624. Circuit block 624 performs the processes associated with STEP 408, DECISION BLOCK 410 and STEP 412 of method 400. Specifically, circuit block 624 updates the counter T based on input signal 620, and outputs a first output signal 626 indicative of the updated counter T. Circuit block 624 also compares the updated counter T to a predefined threshold, and outputs a second output signal 628 representing a flag indicative of whether or not hole or crack was detected.

The logic circuit 600, as shown in FIGS. 7A-7C, represents an example but not limiting implementation of the controller 104 or the or the pressure-based hole detection circuit 208. For example, the logic circuit can vary depending on how the boundary, separating clustering region(s) corresponding to non-defective tubes of the CCV system 102 and the clustering region corresponding to defective tubes or hoses of the CCV system 102, is defined (e.g., the combination of linear and/or nonlinear curves or functions).

Figure 8C:
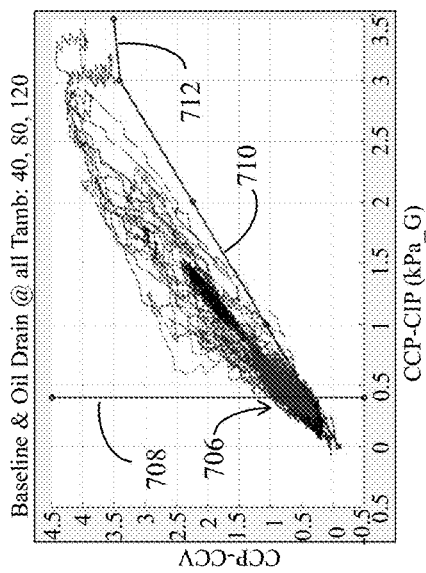
Figure 8B:
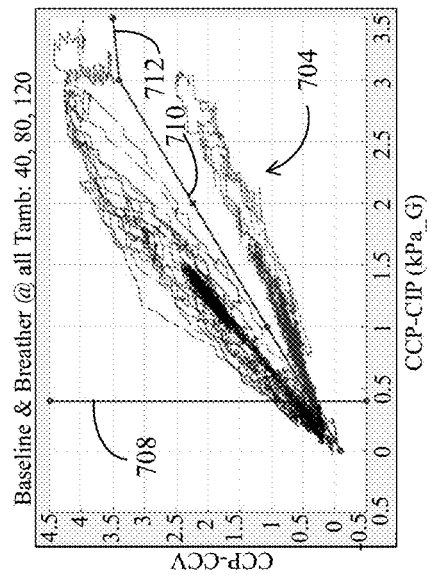
Figure 8A:
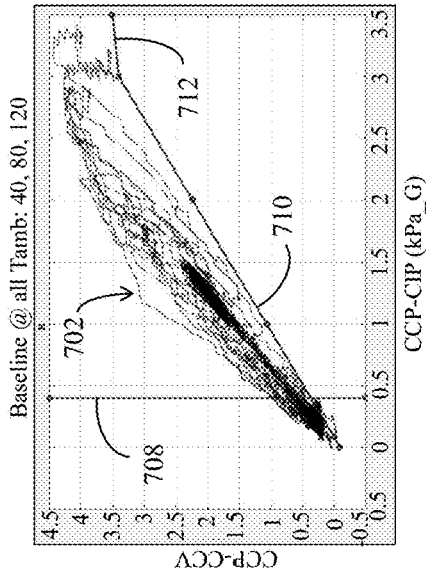

FIGS. 8A-8F show experimental results for three different scenarios, according to an example embodiment. FIGS. 8A and 8D corresponding to experimental results for a CCV system 102 with no holes. FIGS. 8B and 8E corresponding to experimental results for a CCV system 102 having a hole with 20.00 mm diameter in the CCV tube 110. FIGS. 8C and 8F corresponding to experimental results for a CCV system 102 having a hole with 20.00 mm diameter in the oil drain tube 114. FIGS. 8D-8F represent the duty cycle performed on a real vehicle. The top plots in 8D-8F represent the engine speed (Ne) and torque profile (Tq) of the vehicle for each of three days. The plots correspond to different days, different drivers and different road conditions (e.g., construction), which explain why the Ne and Tq plots are not identical. The bottom plots of FIGS. 8D-8F represent the output of the algorithm during each of those runs. FIG. 8D is the no-hole run, FIG. 8E represents the breather (or CCV tube 110) hole run, and FIG. 8F corresponds to the oil drain hole run.

The experimental pressure difference data 702 represents pressure differences for the no-hole scenario. The experimental pressure difference data 704 represents pressure differences for the CCV system 102 having a 20.00 mm hole in the CCV tube 110. The experimental pressure difference data 706 represents pressure differences for the CCV system 102 having a 20.00 mm hole in the oil drain tube 114. The lines 708, 710 and 712 define the boundary of the clustering region(s) corresponding to pressure difference data for defective CCV or draft tubes.

FIGS. 8D-8F show plots of signals associated with the experimental data shown in FIGS. 8A-8C. Specifically, signal 714a represents an output signal indicative of hole detection based on the experimental pressure difference data 702. Signal 714b represents an output signal indicative of hole detection based on the experimental pressure difference data 704, and signal 716b represents a signal indicative of output of DECISION BLOCK 406 based on the experimental pressure difference data 704. Signal 714c represents an output signal indicative of hole detection based on the experimental pressure difference data 706, and signal 716c represents a signal indicative of output of DECISION BLOCK 406 based on the experimental pressure difference data 706.

The signal 714b illustrates successful detection of the hole in the CCV tube 110. In contrast, signal 714c indicates that the hole in the oil drain tube 114 is not detected. Both signals 714b and 714c are consistent with the pressure difference data in FIGS. 8B and 8C.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIGS. 1, 2 and 7A-7C, it should be understood that the controller 104 may include any number of circuits for completing the functions described herein. For example, the activities and functionalities of the pressure-based hole detection circuit 208 may be combined in multiple circuits or as a single circuit. Additional circuits with additional functionality may also be included. Further, the controller 104 may further control other activity beyond the scope of the present disclosure.

As mentioned above and in one configuration, the "circuits" may be implemented in machine-readable medium for execution by various types of processors, such as the processor 204 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. Further, some method steps may be omitted. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A controller for diagnosing malfunctioning in a crankcase ventilation (CCV) system, the controller comprising:
   a processor; and
   a memory storing executable instructions, the executable instructions when executed by the processor, cause the processor to:
      receive a plurality of pressure values including (i) a first pressure value indicative of a pressure of gases flowing between a crankcase and a breather assembly of a vehicle, (ii) a second pressure value indicative of a pressure of gases flowing through a CCV tube from the breather assembly, and (iii) a third pressure value indicative of a pressure of gases flowing in a tube connected to the CCV tube;
      determine a pair of pressure differences including a first pressure difference between the first pressure value and the second pressure value and a second pressure difference between the first pressure value and the third pressure value;
      determine that the pair of pressure differences fall within a predefined clustering region; and
      detect a malfunctioning in the CCV system based on the pair of pressure differences falling within the predefined clustering region.

2. The controller of claim 1, wherein in determining that the pair of pressure differences falls within the predefined clustering region, the processor is further configured to:
   compare the second pressure difference to a first threshold value; and
   compare the first pressure difference to a linear expression of the second pressure difference.

3. The controller of claim 2, wherein the processor is configured to determine that the pair of pressure differences falls within the predefined clustering region upon determining that (i) the second pressure difference is greater than the first threshold value, and (ii) the first pressure difference is smaller than the linear expression of the second pressure difference.

4. The controller of claim 1, wherein the processor is configured to:
   receive a sequence of triplets of pressure measurements, each triplet of pressure measurements including a respective first pressure measurement of the pressure of gases flowing between the crankcase and the breather assembly, a respective second pressure measurement of the pressure of gases flowing through the CCV tube from the breather assembly, and a respective third pressure measurement of the pressure of gases flowing in the tube connected to the CCV tube; and
   for each triplet of pressure measurements,
      calculate a respective pair of pressure differences including a corresponding first pressure difference between the respective first pressure measurement and the respective second pressure measurement, and a corresponding second pressure difference between the respective first pressure measurement and the respective second pressure measurement;
      determine that the respective pair of pressure differences falls within the predefined clustering region; and
      increment a counter upon determining that the respective pair of pressure differences falls within the predefined clustering region.

5. The controller of claim 4, wherein the processor is configured to detect the malfunctioning in the CCV system upon the counter reaches or exceeds a predefined value.

6. The controller of claim 1, wherein the predefined clustering region is defined using training pressure data.

7. The controller of claim 1, wherein the predefined clustering region is a region of a two-dimensional (2-D) space.

8. The controller of claim 1, wherein the processor is configured to update the predefined clustering region using at least one of mileage on an engine of the vehicle, or an age of a sensor used to measure any of the first pressure value, the second pressure value or the third pressure value.

9. The controller of claim 1, wherein the processor is configured to update the predefined clustering region using triplets of pressure measurements, each triplet of pressure measurements including a respective first pressure measurement of the pressure of gases flowing between the crankcase and the breather assembly, a respective second pressure measurement of the pressure of gases flowing through the CCV tube from the breather assembly, and a respective third pressure measurement of the pressure of gases flowing in the tube connected to the CCV tube.

10. The controller of claim 1, wherein the first pressure value is measured by a first sensor arranged in a tube connecting the crankcase to the breather assembly, the second pressure value is measured by a second sensor arranged in the CCV tube, and the third pressure value is measured by a third sensor arranged within the tube connected to the CCV tube.

11. A method of diagnosing malfunctioning in a crankcase ventilation (CCV) system, the method comprising:
   obtaining a plurality of pressure values including (i) a first pressure value indicative of a pressure of gases flowing between a crankcase and a breather assembly of a vehicle, (ii) a second pressure value indicative of a pressure of gases flowing through a CCV tube from the breather assembly, and (iii) a third pressure value indicative of a pressure of gases flowing in a tube connected to the CCV tube;
   calculating a pair of pressure differences including a first pressure difference between the first pressure value and the second pressure value and a second pressure difference between the first pressure value and the second pressure value;
   determining that the pair of pressure differences falls within a predefined clustering region; and
   detecting a malfunctioning in the CCV system based on the pair of pressure differences falling within the predefined clustering region.

12. The method of claim 11, wherein determining that the pressure difference pair falls within the predefined clustering region includes:
   comparing the second pressure difference to a first threshold value; and
   comparing the first pressure difference to a linear expression of the second pressure difference.

13. The method of claim 12, further comprising:
   determining that the pressure difference pair falls within the predefined clustering region upon determining that the (i) second pressure difference is greater than the first threshold value, and (ii) the first pressure difference is smaller than the linear expression of the second pressure difference.

14. The method of claim 11, comprising:
   receiving a sequence of triplets of pressure measurements, each triplet of pressure measurements including a respective first pressure measurement of the pressure of gases flowing between the crankcase and the breather assembly, a respective second pressure measurement of the pressure of gases flowing through the CCV tube from the breather assembly, and a respective third pressure measurement of the pressure of gases flowing in the tube connected to the CCV tube; and
   for each triplet of pressure measurements,
      calculating a respective pair of pressure differences including a corresponding first pressure difference between the respective first pressure measurement and the respective second pressure measurement, and a corresponding second pressure difference between the respective first pressure measurement and the respective third pressure measurement;
      determining that the respective pair of pressure differences falls within the predefined clustering region; and
      incrementing a counter upon determining that the respective pair of pressure differences falls within the predefined clustering region.

15. The method of claim 14, wherein detecting the hole includes detecting the malfunctioning in the CCV system upon the counter reaches or exceeds a predefined value.

16. The method of claim 11, wherein the predefined clustering region is defined using training pressure data.

17. The method of claim 11, wherein the predefined clustering region is a region of a two-dimensional (2-D) space.

18. The method of claim 17, comprising:
   updating the predefined clustering region using at least one of mileage on an engine of the vehicle, or an age of a sensor used to measure any of the first pressure value, the second pressure value or the third pressure value; or
   updating the predefined clustering region using triplets of pressure measurements, each triplet of pressure measurements including a respective first pressure measurement of the pressure of gases flowing between the crankcase and the breather assembly, a respective second pressure measurement of the pressure of gases flowing through the CCV tube from the breather assembly, and a respective third pressure measurement of the pressure of gases flowing in the tube connected to the CCV tube.

19. The method of claim 11, wherein the first pressure value is measured by a first sensor arranged in a tube connecting the crankcase to the breather assembly, the second pressure value is measured by a second sensor arranged in the CCV tube, and the third pressure value is measured by a third sensor arranged within the tube connected to the CCV tube.

20. A system comprising:
   a crankcase ventilation system; and
   a controller coupled to the crankcase ventilation system, the controller configured to:
      receive a plurality of pressure values including (i) a first pressure value indicative of a pressure of gases flowing between a crankcase and a breather assembly of a vehicle, (ii) a second pressure value indicative of a pressure of gases flowing through a CCV tube from the breather assembly, and (iii) a third pressure value indicative of a pressure of gases flowing in a tube connected to the CCV tube;
      determine a pair of pressure differences including a first pressure difference between the first pressure value and the second pressure value and a second pressure difference between the first pressure value and the third pressure value;
determine that the pair of pressure differences falls within a predefined clustering region; and
detect a malfunctioning in the CCV system based on the pair of pressure differences falling within the predefined clustering region.

\* \* \* \* \*